Dec. 12, 1933.  J. BETHENOD  1,938,618

MEANS OF FEEDING ALTERNATING CURRENT ARCS

Filed Jan. 27, 1931

INVENTOR
Joseph Bethenod
BY
*Samuel Ostrolenk*
ATTORNEY

Patented Dec. 12, 1933

1,938,618

UNITED STATES PATENT OFFICE 1,938,618

MEANS OF FEEDING ALTERNATING CURRENT ARCS

Joseph Bethenod, Paris, France, assignor to Radio Patents Corporation, New York, N. Y., a corporation of New York Application January 27, 1931, Serial No. 511,491, and in France January 30, 1930

2 Claims. (Cl. 219—8)

Generally speaking, there are two methods for compensating by means of a condenser, the wattless current of an A. C. circuit feeding an arc:

According to the well known method a condenser can be connected in parallel with the feeding circuit, made up of a reactor in series with the arc. For instance, in the case of a welding arc, the stability of which requires a high open circuit voltage, the capacitance volt-amperes must be taken much greater than the watts consumed by the arc, if unity power factor is required.

According to the second method, the condenser is connected in parallel with the welding arc itself, and the working conditions of the condenser are quite different. It can be shown that it is then possible to obtain unity power factor with a capacitance, the volt amperes of which are only equal to the watts consumed by the arc.

However, the latter method presents some difficulties, chiefly about the striking of the arc, when the electrodes are cold. Oscillatory discharges take place then between the said electrodes, and very strong high frequency currents can be induced in some parts of the plant. Similar phenomena occur when the working conditions of the arc are disturbed in any way.

Figure 1:
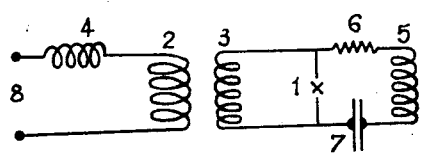
Figure 2:
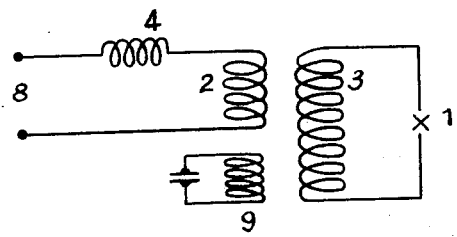

According to the present invention, means are provided to prevent such oscillatory discharges, the effect of which can be very deleterious. The accompanying drawing illustrates, by way of examples, two embodiments of the invention: Figure 1 is a circuit diagram, according to which the arc 1 is fed by means of a transformer 2, 3, the primary of which 2, is connected to the alternating current supply 8, through the intermediary of an iron core inductance coil 4, which ensures the required drooping volt-ampere characteristic of the feeding circuit. The capacitor 7 is in parallel relation with the said arc, and when the electrodes are cold, very strong discharges of very high frequency occur, owing to the very low impedance of the discharge circuit. In order to prevent such discharges, an inductance 5 is placed in series with the capacitor 7, so as to reduce the frequency of the discharges; on the other hand, a resistor 6 can be added in the purpose of increasing the damping of the said discharges. It is thus possible to limit to the desired extent the effect of the induced electric surgings, without interfering with the efficiency of the plant. According to the diagram of Fig. 2, the same result can be obtained without any additional impedance, if the capacitor 7 is connected to a tertiary winding 9 of the feeding transformer. When the permanent state is reached, the effect of the capacitor is then equivalent to the effect of a capacitor shunting the arc, but when transient phenomena occur, no high frequency discharges of the said capacitor can take place between the electrodes, owing to the internal impedance of the transformer. Of course, the said tertiary winding can be combined with one of the windings 2 and 3, so as to form an auto-transformer; furthermore, in some cases, the capacitor can be connected directly to the terminals of the primary winding 2.

Finally, it should be noticed that it is possible to reduce the power delivered to the arc by increasing the inductance 1 of the coil 4; if, at the same time, the capacity $c$ of the capacitor 7 is diminished, so that the product $1\ c$ remains nearly constant, unity power factor is available, whatever be the load.

I wish it to be understood that I do not desire to limit myself to the arrangements herein set forth, as it is obvious that various modifications may be made therein without departing from the essential features of my invention as defined in the appended claims:

I claim:

1. In an electrical system, a source of alternating current; an arc gap electrically connected to said source of alternating current; a capacitor electrically connected to said source of alternating current in parallel with said arc gap; and an inductance coil electrically interposed between said source of alternating current and said capacitor and arc.

2. In an electrical system, a source of power supply; an arc gap electrically connected to said source of power supply; a capacitor electrically connected to said source of power supply in parallel with said arc gap; and means interposed between said source of power supply and said capacitor and arc for preventing oscillatory discharges between the electrodes of said arc gap when transient phenomena occur.

JOSEPH BETHENOD.